(12) United States Patent
Wakasugi et al.

(10) Patent No.: US 12,444,728 B2
(45) Date of Patent: Oct. 14, 2025

(54) JOINING DEVICE

(71) Applicant: HONDA MOTOR CO., LTD., Tokyo (JP)

(72) Inventors: Ayaka Wakasugi, Tokyo (JP); Daigo Mukasa, Tokyo (JP); Toru Ikeda, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 204 days.

(21) Appl. No.: 18/128,311

(22) Filed: Mar. 30, 2023

(65) Prior Publication Data

US 2023/0317915 A1    Oct. 5, 2023

(30) Foreign Application Priority Data

Mar. 31, 2022    (JP) ................................. 2022-058534

(51) Int. Cl.
*H01M 4/04*    (2006.01)

(52) U.S. Cl.
CPC ................................ *H01M 4/0435* (2013.01)

(58) Field of Classification Search
CPC ... H01M 4/0435; H01M 4/8896; B29C 65/08; B29C 65/18
See application file for complete search history.

(56) References Cited

U.S. PATENT DOCUMENTS

| | | |
|---|---|---|
| 2007/0252700 A1 | 11/2007 | Ishihara et al. |
| 2008/0005895 A1 | 1/2008 | Aoyama et al. |
| 2012/0132697 A1 | 5/2012 | Yano et al. |
| 2014/0020237 A1 | 1/2014 | Yuhara et al. |

FOREIGN PATENT DOCUMENTS

| | | | |
|---|---|---|---|
| JP | H11-250365 A | | 9/1999 |
| JP | 2001076743 A | * | 3/2001 |
| JP | 2004-265920 A | | 9/2004 |
| JP | 2005-335755 A | | 12/2005 |
| JP | 2006080040 A | * | 3/2006 |
| JP | 2010-142414 A | | 7/2010 |
| JP | 2012-227128 A | | 11/2012 |
| JP | 2013-004393 A | | 1/2013 |
| JP | 5522851 B2 | | 6/2014 |
| WO | 2008/044655 A1 | | 4/2008 |

OTHER PUBLICATIONS

Office Action dated Jul. 15, 2025 issued in the corresponding Japanese Patent Application No. 2022-058534 with the English machine translation thereof.

* cited by examiner

*Primary Examiner* — Daniel McNally
(74) *Attorney, Agent, or Firm* — Carrier, Shende & Associates P.C.; Joseph P. Carrier; Jeffrey T. Gedeon (57) ABSTRACT

A joining device includes a first roller that rotates an attached first workpiece in the conveying direction to convey the first workpiece, and a second roller that rotates the attached second workpiece in the conveying direction to join the second workpiece to the conveyed first workpiece by heat. The second roller includes a main body drum, a plurality of protruding portions provided at intervals in the rotational direction of the main body drum, and a plurality of suction portions that is provided to each of the protruding portions and attaches a second workpiece onto end surfaces of the protruding portions.

7 Claims, 10 Drawing Sheets

JOINING DEVICE

CROSS-REFERENCE TO RELATED APPLICATIONS

This application is based upon and claims the benefit of priority from Japanese Patent Application No. 2022-058534 filed on Mar. 31, 2022, the contents of which are incorporated herein by reference.

BACKGROUND OF THE INVENTION

Field of the Invention

The present invention relates to a joining device for joining a first workpiece and a second workpiece.

Description of the Related Art

In recent years, there has been research and development on fuel cells that contribute to energy efficiency to ensure access to affordable, reliable, sustainable, and modern energy.

JP 2013-004393 A discloses an apparatus for manufacturing a membrane electrode assembly (MEA). In this apparatus, the electrolyte membrane sheet and the catalyst electrode layer sheet are conveyed over a plurality of rollers. The electrolyte membrane sheet and the catalyst electrode layer sheet are superposed on each other by a pair of rollers disposed in the course of conveyance, and then joined by heating and pressing.

SUMMARY OF THE INVENTION

However, in the apparatus disclosed in JP 2013-004393 A, it is not possible to join short workpieces that cannot be arranged over a plurality of rollers.

An object of the present invention is to solve the aforementioned problems.

One aspect of the present invention is a joining device that joins a sheet-like first workpiece and a sheet-like second workpiece, comprising: a first roller that attaches the first workpiece to a roller outer peripheral surface of the first roller, rotates the attached first workpiece in a conveying direction, and conveys the first workpiece; a second roller that attaches the second workpiece to a roller outer peripheral surface of the second roller, rotates the attached second workpiece in the conveying direction, and joins the second workpiece by heat to the first workpiece conveyed by the first roller; and a heater that is provided to at least one of the first roller or the second roller and generates heat required for the joining, wherein the second roller includes: a main body drum that is rotatably supported; a plurality of protruding portions that are provided at intervals in a rotational direction of the main body drum and protrude from an outer peripheral surface of the main body drum toward a radial direction of the main body drum; and a plurality of suction portions that are provided to each of the protruding portions to attach the second workpiece to an end surface of the protruding portion.

According to the aspect of the present invention, it is possible to join short workpieces that cannot be arranged over a plurality of rollers. Further, since the first workpiece and the second workpiece are joined in a state in which they are attached (attached under suction), it is possible to suppress displacement, deformation, over-pressurization and the like of the first workpiece and the second workpiece.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Figure 1:
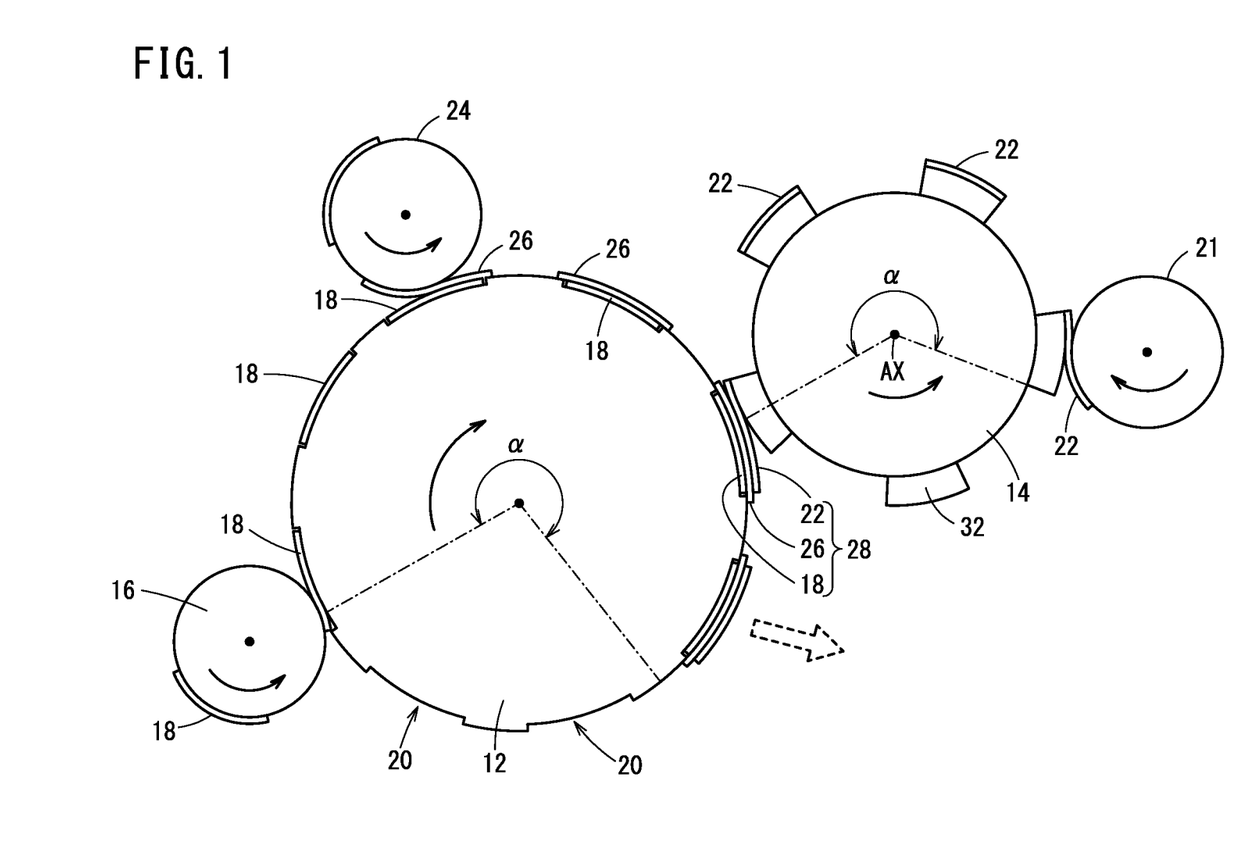
FIG. 1 is a diagram showing a joining device.

FIG. 1 is a diagram showing a joining device 10. The joining device 10 has a first roller 12 and a second roller 14.

The first roller 12 is configured in a manner so that a first workpiece 18 supplied from a first workpiece supply roller 16 can be attached (attached under suction) to the roller outer peripheral surface of the first roller 12. The first roller 12 conveys the first workpiece 18 by rotating the first workpiece 18 attached to the roller outer peripheral surface of the first roller 12 in the conveying direction. The first workpiece 18 is shorter than the roller circumference of the first roller 12 and cannot be laid over the first roller 12 and the second roller 14. The roller circumference is a length in the rotational direction on the roller outer peripheral surface.

In the present embodiment, the first roller 12 has a plurality of recesses 20 for accommodating the first workpieces 18. The plurality of recesses 20 are formed on the roller outer peripheral surface of the first roller 12 at intervals in the rotational direction of the first roller 12. In this case, the first roller 12 attaches the first workpiece 18 to the recess 20.

The first workpiece 18 that is conveyed in a state of being attached to the first roller 12 passes between the first roller 12 and the second roller 14.

The second roller 14 is configured to be capable of attaching the second workpiece 22 supplied from the second workpiece supply roller 21 onto the roller outer peripheral surface. The second roller 14 rotates, in the conveying direction, the second workpiece 22 that is attached to the roller outer peripheral surface of the second roller 14 and joins by heat the second workpiece 22 to the first workpiece 18 conveyed by the first roller 12. The second workpiece 22 is shorter than the roller circumference of the second roller 14 and cannot be laid over the first roller 12 and the second roller 14.

The first workpiece 18 to which the second workpiece 22 is joined is conveyed in a state in which it is attached to the first roller 12. Thereafter, before reaching the first workpiece supply roller 16, the first workpiece 18 to which the second workpiece 22 is joined is removed from the first roller 12 by a robot or the like.

Thus, in the joining device 10, short workpieces that cannot be laid over a plurality of rollers are joined to each other. Further, in the case of the joining device 10, the first workpiece 18 and the second workpiece 22 are joined in a state in which the first workpiece 18 and the second workpiece 22 are attached to each other, whereby misalignment, deformation, and overpressure, and suchlike of the first workpiece 18 and the second workpiece 22 are suppressed.

In the present embodiment, the joining device 10 further includes a resin frame supply roller 24. The resin frame supply roller 24 supplies a resin frame 26 toward a traveling path of the first workpiece 18 being from the first workpiece supply roller 16 to the second roller 14. The resin frame 26 is a frame member made of resin and has an opening. The opening of the resin frame 26 is smaller than the opening of the recess 20.

In a state that the inner peripheral portion of the resin frame 26 supplied by the resin frame supply roller 24 overlaps with the peripheral portion of the first workpiece 18, the first roller 12 attaches the resin frame 26 to the roller outer peripheral surface of the first roller 12. In this case, the second roller 14 joins the second workpiece 22 to the inner peripheral portion of the resin frame 26 and the first workpiece 18. Through this joining, a joined body 28 made up from the first workpiece 18, the second workpiece 22, and the resin frame 26 is obtained.

Figure 2:
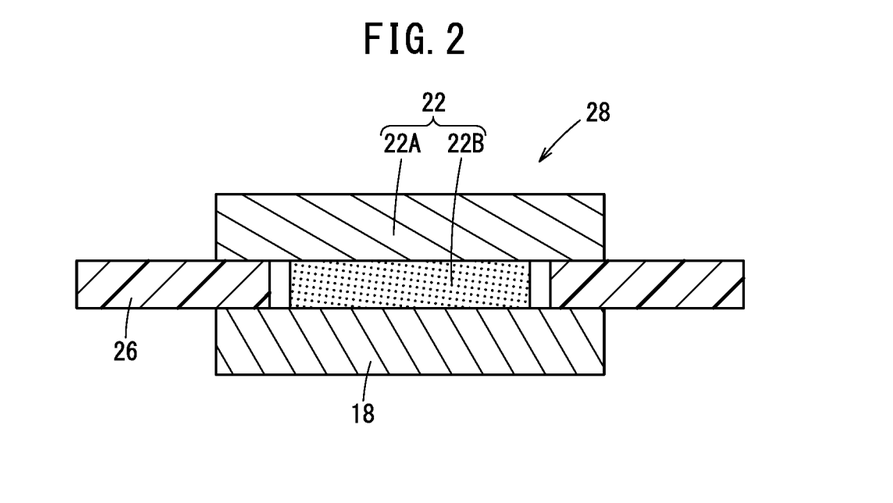
FIG. 2 is a schematic view showing a case where the joined body is a resin-framed membrane electrode assembly.

The joined body 28 may be a resin-framed membrane electrode assembly used in a power generation cell of a fuel cell. FIG. 2 is a schematic view showing a case where the joined body 28 is a resin-framed membrane electrode assembly.

When the joined body 28 is a resin-framed membrane electrode assembly, the first workpiece 18 is a first electrode catalyst layer used for a power generation cell. The first electrode catalyst layer is a sheet member in which an anode electrode layer (or a cathode electrode layer) and a catalyst layer are joined together, and has porosity. On the other hand, the second workpiece 22 is a sheet member in which the second electrode catalyst layer 22A used for the power generation cell and the electrolyte membrane 22B used for the power generation cell are joined together, and has porosity. The electrolyte membrane 22B is smaller than the second electrode catalyst layer 22A, and the second electrode catalyst layer 22A protrudes from the periphery of the electrolyte membrane 22B. The inner peripheral portion of the resin frame 26 is disposed at the protruding portion. The resin frame 26 is non-porous. The inner peripheral portion of the resin frame 26 is sandwiched between the second electrode catalyst layer 22A and the first electrode catalyst layer. In this state, the first electrode catalyst layer, the second electrode catalyst layer 22A, and the resin frame 26 are joined to each other to obtain the joined body 28.

The first workpiece 18 may be a sheet member formed by joining the second electrode catalyst layer 22A and the electrolyte membrane 22B used for the power generation cell. In this case, the second workpiece 22 is a first electrode catalyst layer.

Figure 3:
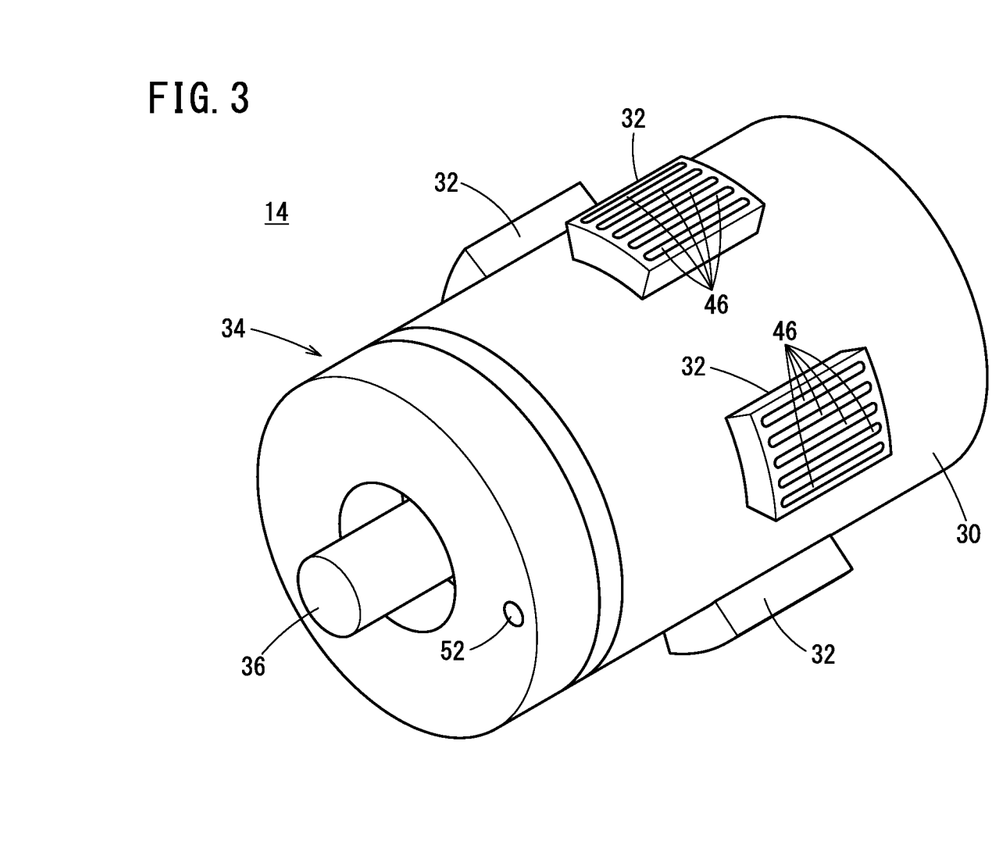
FIG. 3 is an external view of a second roller.
Figure 4:
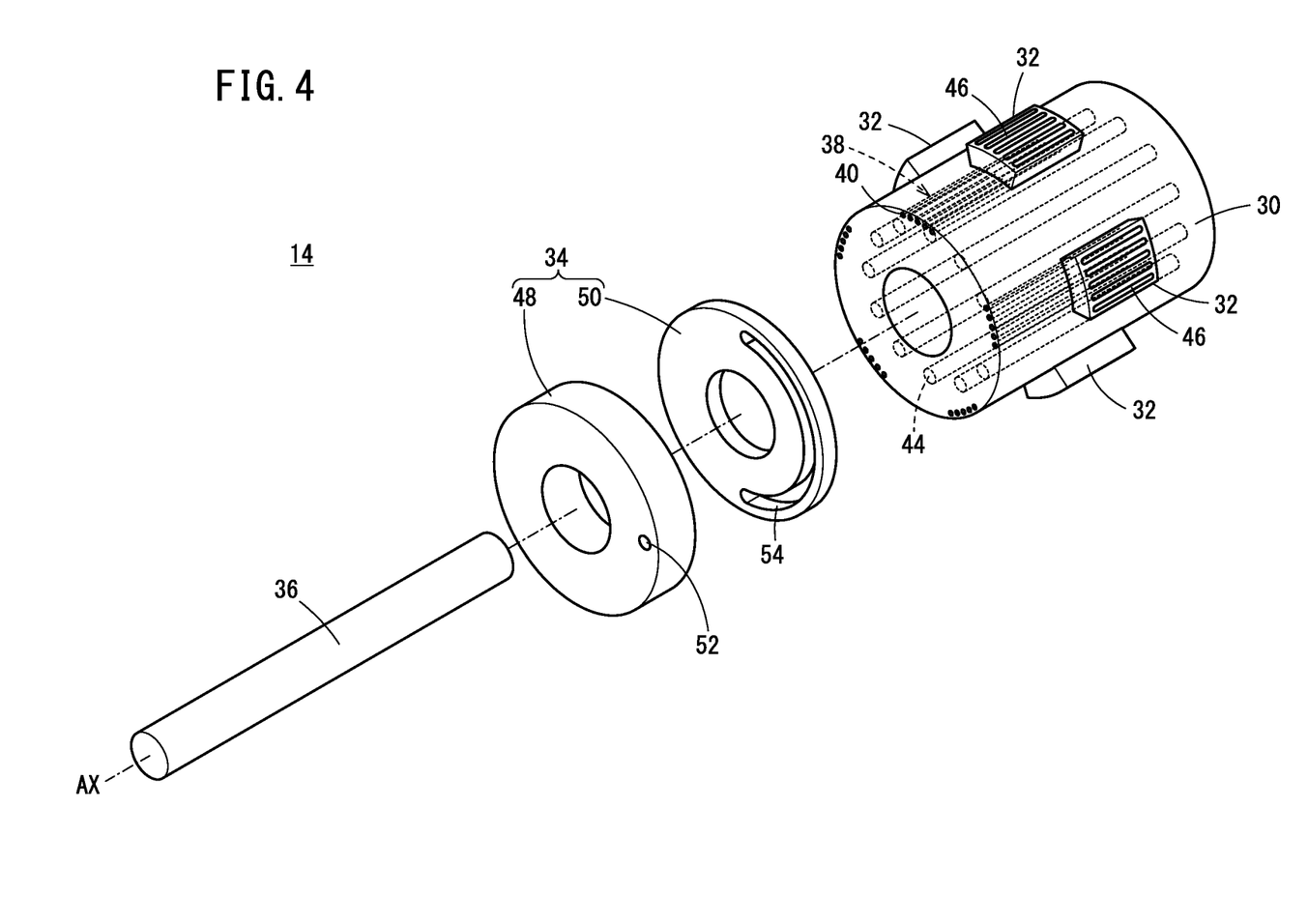
FIG. 4 is an exploded view of the second roller.
Figure 5:
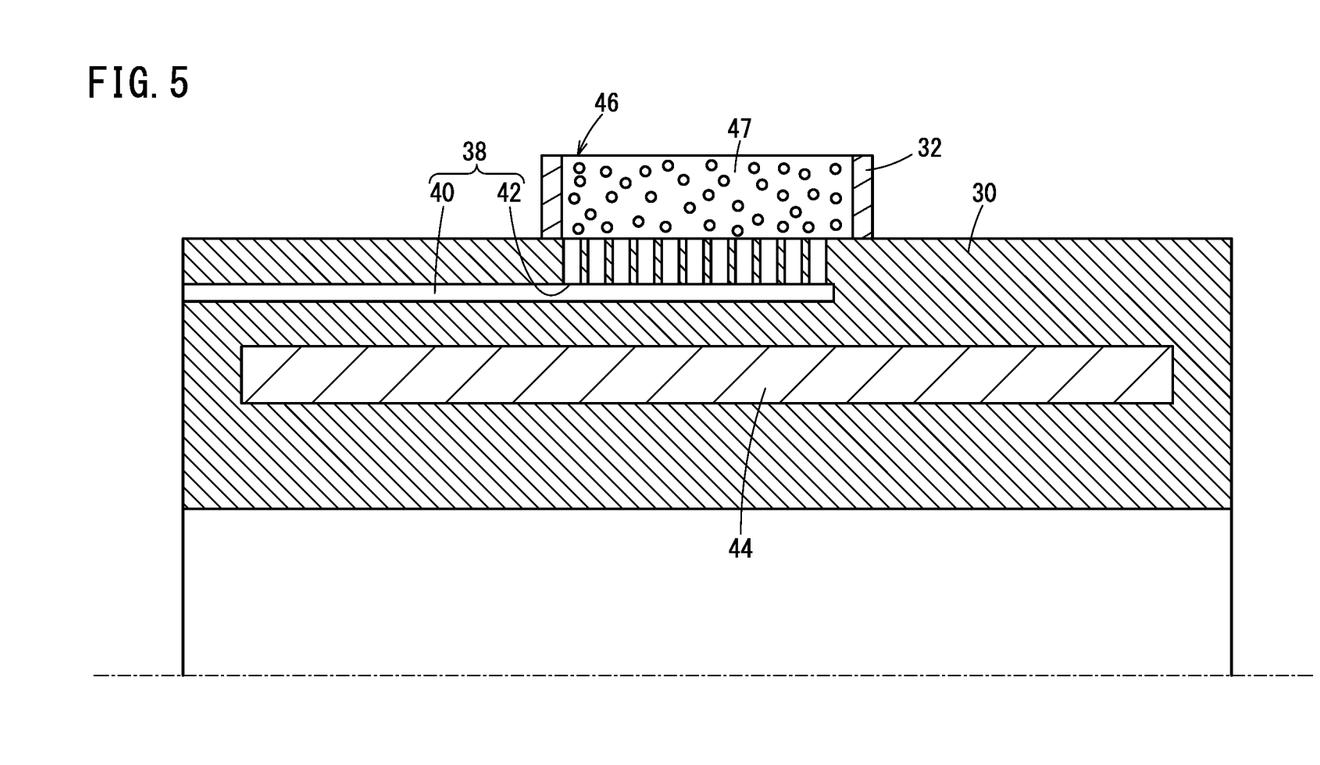
FIG. 5 is a sectional view showing part of a main body drum.

FIG. 3 is an external view of the second roller 14. FIG. 4 is an exploded view of the second roller 14. FIG. 5 is a sectional view showing part of a main body drum 30. The second roller 14 has the main body drum 30, a protruding portion 32, and a manifold portion 34.

The main body drum 30 is a rotating main body. The main body drum 30 has a thermal conductivity higher than air and is formed in a substantially cylindrical shape. A shaft portion 36 is fixed to the main body drum 30. The main body drum 30 is rotatably supported by a shaft portion 36.

The main body drum 30 has a suction flow path 38 (see FIGS. 4 and 5). The suction flow path 38 is a passage for sucking air in and is formed inside the main body drum 30. The suction flow path 38 includes a main flow path 40 and a branch flow path 42 (see FIG. 5). The main flow paths 40 are arranged at intervals in the circumferential direction of the main body drum 30. Each main flow path 40 extends along the rotation axis of the main body drum 30 and opens at an end face of the main body drum 30 facing the manifold portion 34. The branch flow paths 42 are spaced apart from each other in the rotational axis direction of the main body drum 30. Each branch flow path 42 branches from the main flow path 40, extends in the radial direction of the main body drum 30, and opens on the outer peripheral surface of the main body drum 30.

The main body drum 30 has a heater 44 (see FIGS. 4 and 5). The heater 44 is installed inside the main body drum 30. In the present embodiment, the heater 44 is disposed on the inner side of the plurality of main flow paths 40. The heater 44 may be of an oil type or an electric heat type. The number of heaters 44 may be one or a plurality of heaters 44. When there is a plurality of heaters 44, the heaters 44 are arranged at intervals in the circumferential direction of the main body drum 30. FIG. 4 shows an example in which a plurality of heaters 44 are provided. The heater 44 generates heat required for joining and heats the second workpiece 22 via the main body drum 30. In this case, the resin frame 26 and the first workpiece 18 are heated via the second workpiece 22, and the first workpiece 18, the second workpiece 22, and the resin frame 26 are joined to each other.

The protruding portions 32 are provided at intervals in the rotational direction of the main body drum 30. Each protruding portion 32 protrudes from the outer peripheral surface of the main body drum 30 in the radial direction of the main body drum 30. The protruding portion 32 may be formed integrally with the main body drum 30 or may be attached to the main body drum 30 by an attachment member. The protruding portion 32 has the same thermal conductivity as the main body drum 30 or has a thermal conductivity larger than the main body drum 30.

Each protruding portion 32 has a plurality of suction portions 46. The plurality of suction portions 46 are spaces for attaching the second workpiece 22 under suction onto the end surface of the protruding portion 32 and are formed in the protruding portion 32. Each suction portion 46 communicates with a plurality of branch flow paths 42. A porous member 47 is accommodated in the suction portion 46.

The manifold portion 34 is attached to one end portion of the main body drum 30. The manifold portion 34 is formed by joining a first plate 48 and a second plate 50. The first plate 48 and the second plate 50 may be integrally formed. The manifold portion 34 is formed in, for example, an annular shape.

The first plate 48 has a through hole 52 connected to a suction pipe of a suction pump. The second plate 50 has an arcuate notch 54. The through hole 52 communicates with the notch 54. The notch 54 communicates with part of a plurality of main flow paths 40 arranged at intervals in the circumferential direction of the main body drum 30. The part of the plurality of main flow paths 40 is a main flow path 40 arranged in a suction permission range. The suction permission range is a range of an obtuse angle $\alpha$ centered on the axis AX (FIG. 1) of the main body drum 30 and corresponds to the traveling path of the second workpiece 22 conveyed by the second roller 14.

The manifold portion 34 is rotatably attached to the main body drum 30 and can change the suction permission range in the circumferential direction (rotational direction) of the main body drum 30.

The manifold portion 34 connects the main flow path 40 arranged in the suction permission range to the suction pump via the through hole 52 and the notch 54. In this case, the manifold portion 34 causes the suction pump to suck the second workpiece 22 that will be in contact with the end surface of the protruding portion 32, through the suction portion 46 communicating, via the branch flow path 42, with the main flow path 40 connected to the suction pump and causes the second workpiece 22 to be attached to the end surface of the protruding portion 32.

Figure 6:
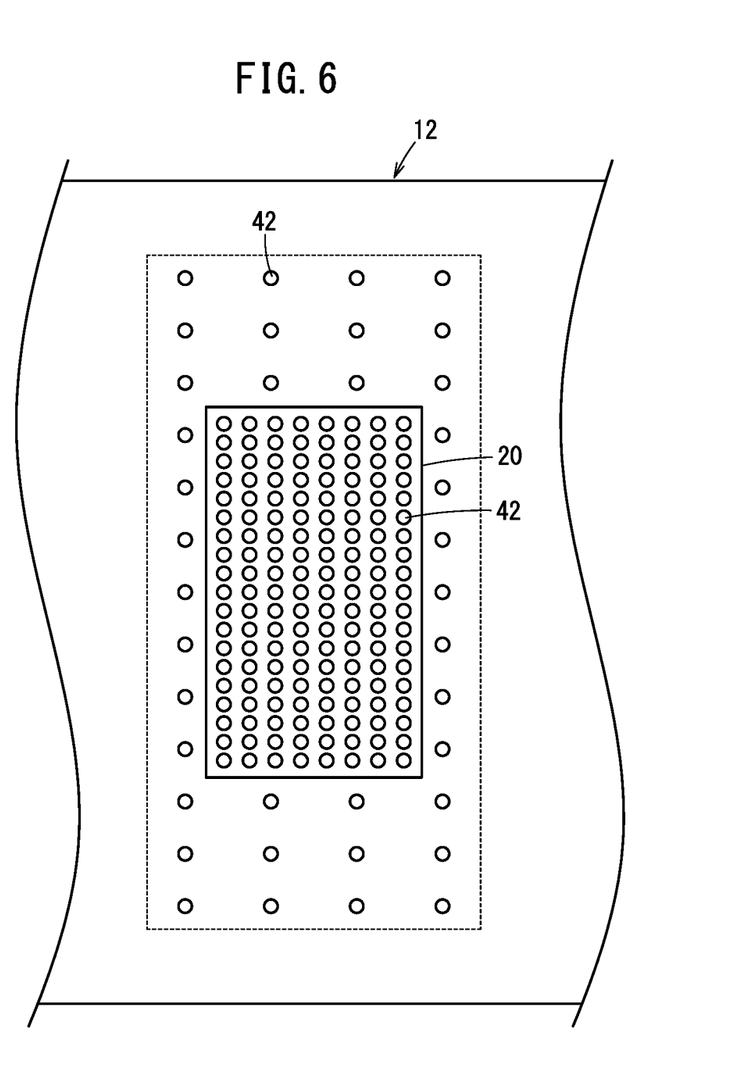
FIG. 6 is a front view of a recess of the first roller.

The first roller 12 has the same configuration as the second roller 14 except for the protruding portion 32 of the second roller 14. In the case of the first roller 12, the protruding portion 32 is replaced by the recess 20 (FIG. 1). FIG. 6 is a front view of the recess 20 of the first roller 12.

In the case of the first roller 12, part of the plurality of branch flow paths 42 opens at the bottom surface of the recess 20. The manifold section 34 causes a suction pump to suck a first workpiece 18 that will be in contact with the bottom surface of a recess 20, through the branch flow path 42 that communicates with the main flow path 40 connected to the suction pump and causes the suction pump to attach the first workpiece 18 into the recess 20.

In the present embodiment, in order to attach the resin frame 26, another part of the plurality of branch flow paths 42 opens on the roller outer peripheral surface around each recess 20. The manifold section 34 causes the suction pump to suck the resin frame 26 that will be in contact with the periphery of the recess 20, through the branch flow path 42 communicating with the main flow path 40 connected to the suction pump and attaches the resin frame 26 to the roller outer circumferential surface around the recess 20.

In the present embodiment, the numerical aperture of the branch flow path 42 per predetermined area on the bottom surface of the recess 20 is larger than the numerical aperture of the branch flow path 42 per predetermined area on the roller outer peripheral surface around the recess 20. Therefore, the suction force acting on the bottom surface of the recess 20 can be made larger than the suction force acting on the roller outer peripheral surface around the recess 20. As a result, even if the first workpiece 18 is porous, the first workpiece 18 can be attached as effectively as the non-porous resin frame 26.

In the case of the first roller 12, the main flow path 40 with which the notch 54 of the manifold portion 34 communicates is disposed in a range of an obtuse angle α (suction permission range) centered on the axis AX (FIG. 1) of the main body drum 30. This range corresponds to the traveling path of the first workpiece 18 conveyed by the first roller 12. Further, in the case of the first roller 12, the heater 44 may be omitted. When the heater 44 in the first roller 12 is not omitted, the heater 44 in the second roller 14 may be omitted.

Figure 7:
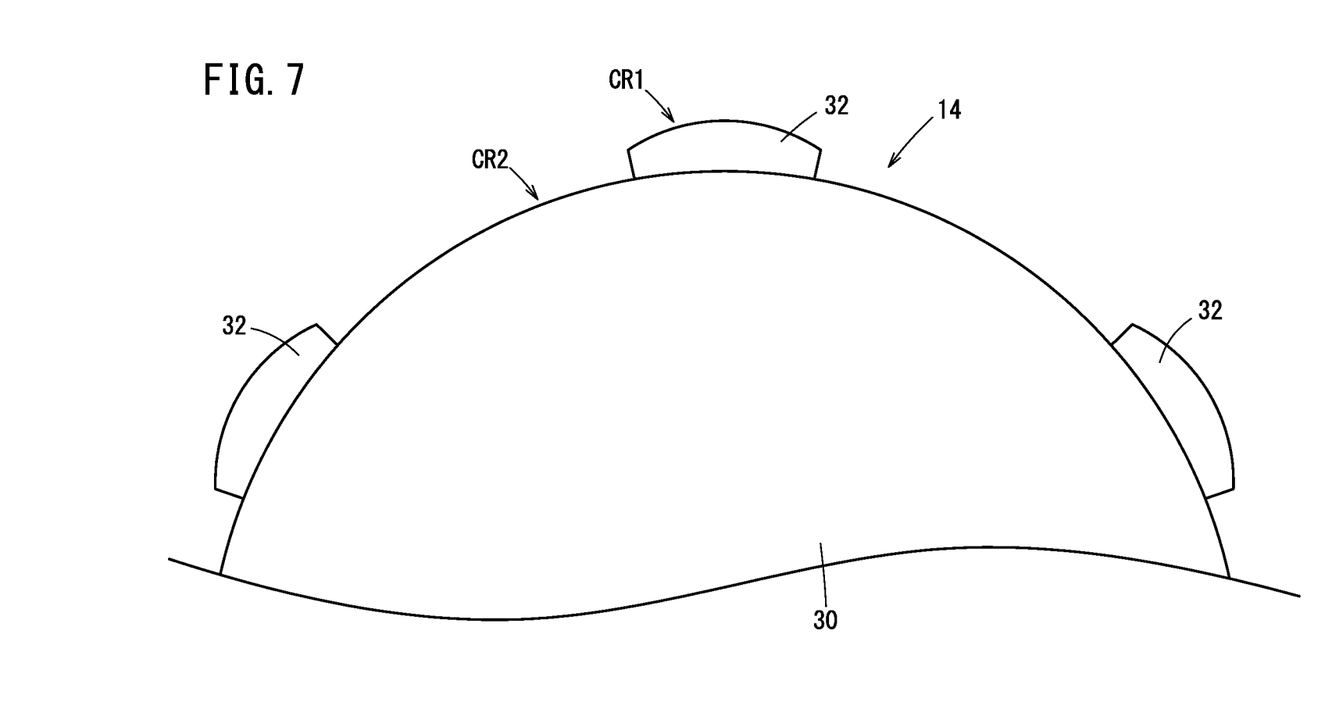
FIG. 7 is an enlarged view showing part of the second roller.
Figure 8:
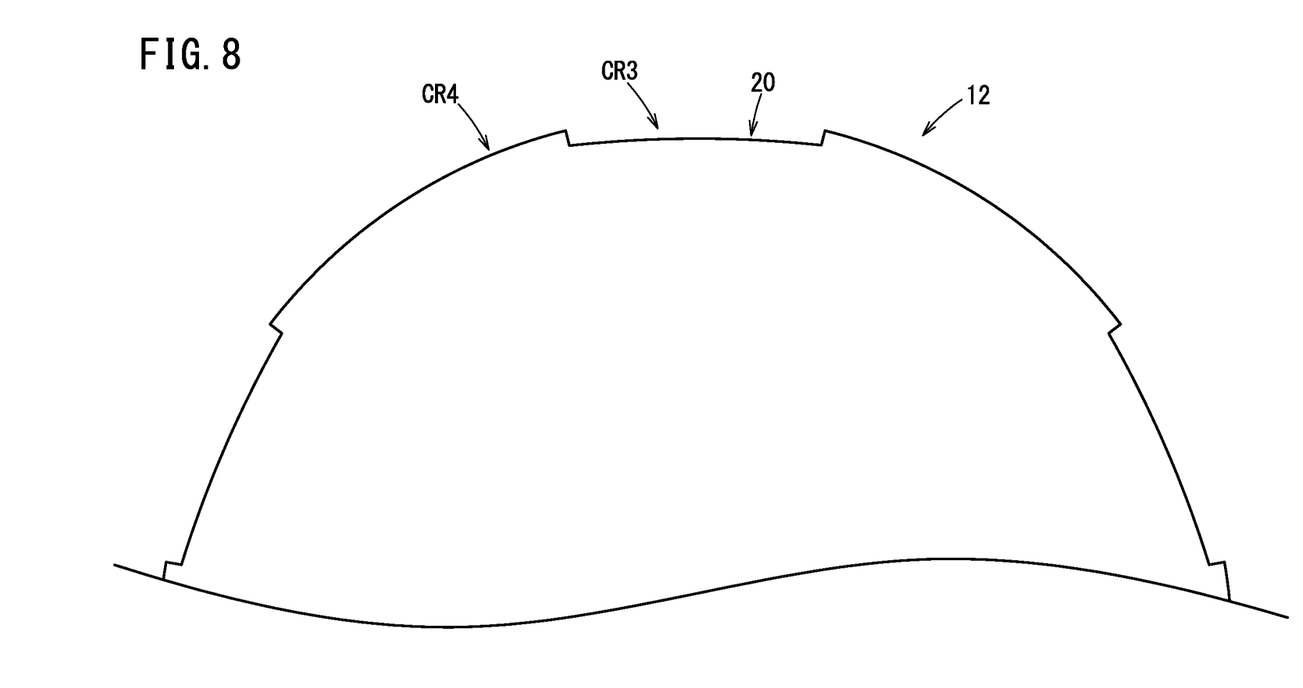
FIG. 8 is an enlarged view showing part of the first roller.

FIG. 7 is an enlarged view showing part of the second roller 14. FIG. 8 is an enlarged view showing part of the first roller 12. In the present embodiment, the radius of curvature CR1 of the end surface of the protruding portion 32 of the second roller 14 is smaller than the radius of curvature CR3 of the suction surface (bottom surface of the recess 20) of the first roller 12 to which the first workpiece 18 is attached. In this way, it is possible to suppress the occurrence of a difference in shrinkage due to natural cooling between the first workpiece 18 conveyed in a suction state and the second workpiece 22 joined to the first workpiece 18 and conveyed in a non-suction state. As a result, as compared with the case where the radius of curvature CR1 of the end face of the protruding portion 32 and the radius of curvature CR3 of the suction surface are the same, it is possible to prevent the joined body 28 from warping toward the first roller 12.

Further, in the present embodiment, the radius of curvature CR1 of the end surface of the protruding portion 32 is smaller than the radius of curvature CR2 of the outer peripheral surface of the main body drum 30 other than the protruding portion 32. Thus, the radius of curvature CR1 of the end face of the protruding portion 32 can be made smaller than the radius of curvature CR3 of the suction surface of the first roller 12 without reducing the entire second roller 14. As a result, it is possible to suppress a decrease in the number of second workpieces 22 that can be attached to the second roller 14.

In addition, in the present embodiment, the radius of curvature CR3 of the suction surface of the first roller 12 is larger than the radius of curvature CR4 of the outer peripheral surface of the first roller 12 other than the suction surface. Thus, the radius of curvature CR1 of the end face of the protruding portion 32 can be made smaller than the radius of curvature CR3 of the suction surface of the first roller 12 without reducing the entire first roller 12. As a result, it is possible to suppress a decrease in the number of first workpieces 18 that can be attached to the first roller 12.

When the radius of curvature CR1 of the end face of the protruding portion 32 of the second roller 14 is different from the radius of curvature CR3 of the suction surface of the first roller 12, a difference in moving speed between the first workpiece 18 and the second workpiece 22 may occur at the joint portion where the second workpiece 22 is joined to the first workpiece 18. Therefore, in this embodiment, the relative rotation speed of the rotation speed of the second roller 14 to the rotation speed of the first roller 12 is adjusted.

Figure 9:
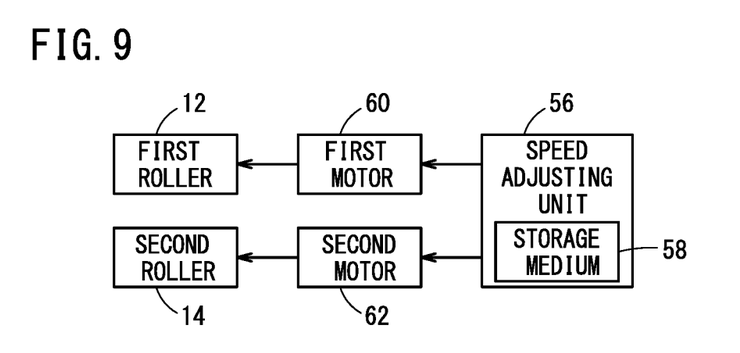
FIG. 9 is a diagram showing the configuration of a control system for controlling the rotational speeds of the first roller and the second roller.

FIG. 9 is a diagram showing a configuration of a control system for controlling the rotational speeds of the first roller 12 and the second roller 14. The joining device 10 includes a speed adjusting unit 56, a first motor 60, and a second motor 62.

The speed adjusting unit 56 includes a processor such as a CPU or a GPU, and a storage medium 58. The storage medium 58 includes a volatile memory such as a RAM and a non-volatile memory such as a ROM, a flash memory, and a hard disk. The speed adjusting unit 56 may be realized by a processor processing a program stored in the storage medium 58. The speed adjusting unit 56 may be realized by an integrated circuit such as an ASIC or an FPGA. The speed adjusting unit 56 may be constituted by an electronic circuit including discrete devices.

The speed adjusting unit 56 controls the first motor 60 for rotationally driving the first roller 12 to adjust the rotational speed of the first roller 12. The speed adjusting unit 56 controls the second motor 62 for rotationally driving the second roller 14 to adjust the rotational speed of the second roller 14.

Figure 10:
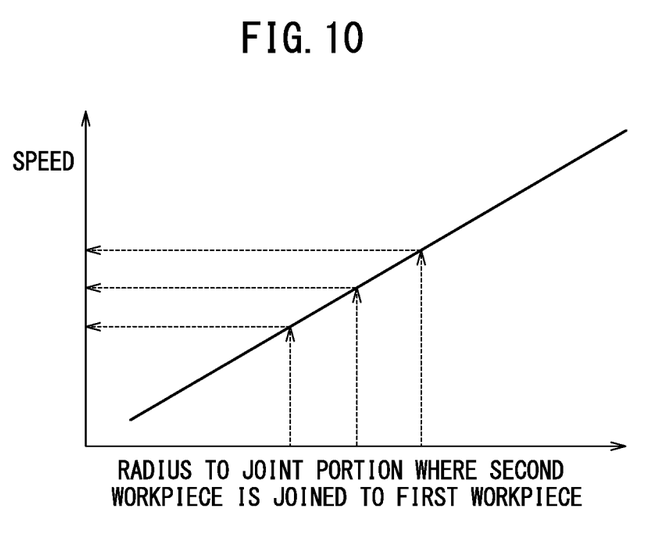
FIG. 10 is a graph showing the relationship between the speed and the radius to a joint portion where the second workpiece is joined to the first workpiece.

FIG. 10 is a graph showing the relationship between the speed and the radius to the joint portion where the second workpiece 22 is joined to the first workpiece 18. The storage medium 58 stores a table showing the relationship in which the speed increases as the radius to the joint portion increases. The speed adjusting unit 56 adjusts the relative rotation speed of the rotation speed of the second roller 14 to the rotation speed of the first roller 12 based on the table stored in the storage medium 58. In this case, the speed adjusting unit 56 adjusts the relative rotation speed so that the difference in moving speed between the first workpiece 18 and the second workpiece 22 becomes small at the joint portion where the second workpiece 22 is joined to the first workpiece 18. For example, the speed adjusting unit 56 makes the rotational speed of the first roller 12 at the joint portion slower than the rotational speed of the first roller 12 at a non-joint portion. Further, the speed adjusting unit 56 makes the rotational speed of the second roller 14 at the joint portion faster than the rotational speed of the second roller 14 at the non-joint portion.

By adjusting the relative rotation speed in this manner, it is possible to suppress the application of a force in the shearing direction between the first workpiece 18 and the second workpiece 22 and as a result, it is possible to reduce deformation or the like of the first workpiece 18 or the second workpiece 22.

[Present Invention]

The present invention is not limited to the above-described embodiments and modifications, and various configurations can be adopted without departing from the gist of the present invention. The inventions and effects that can be understood from the above description will be described below.

(1) The present invention is a joining device (10) that joins a sheet-like first workpiece (18) and a sheet-like second workpiece (22) includes a first roller (12) that attaches the first workpiece to the roller outer peripheral surface of the first roller, rotates the attached first workpiece in the conveying direction, and conveys the first workpiece, a second roller (14) that attaches the second workpiece to the roller outer peripheral surface of the second roller, rotates the attached second workpiece in the conveying direction to join by heat the second workpiece to the first workpiece conveyed by the first roller, and a heater (44) that is provided to at least one of the first roller and the second roller and generates heat required for the joining, and the second roller includes a main body drum (30) that is rotatably supported, a plurality of protruding portions (32) that are provided at intervals in the rotational direction of the main body drum and protrude from the outer peripheral surface of the main body drum toward the radial direction of the main body drum, and a plurality of suction portions (46) that are provided to each of the protruding portions and to attach the second workpiece to the end surfaces of the protruding portion.

As a result, it is possible to join short workpieces that cannot be arranged over a plurality of rollers. Further, since the first workpiece and the second workpiece are joined in a state in which they are attached (attached under suction), it is possible to suppress displacement, deformation, overpressurization and the like of the first workpiece and the second workpiece.

(2) The present invention is the joining device that may be configured in a manner so that the first roller conveys the first workpiece to which the second workpiece is joined, and a radius of curvature (CR1) of an end face of the protruding portion is smaller than a radius of curvature (CR3) of a suction surface of the first roller to which the first workpiece is attached. As a result, it is possible to suppress the occurrence of a difference in shrinkage due to natural cooling between a first workpiece conveyed in a suction state and a second workpiece joined to the first workpiece and conveyed in a non-suction state. As a result, it is possible to prevent the joined body from warping toward the first roller as compared with the case where the radius of curvature of the suction surface and the radius of curvature of the end face of the protruding portion are the same.

(3) The present invention is the joining device that may be configured in a manner so that the radius of curvature of the suction surface is larger than a radius of curvature (CR4) of an outer peripheral surface of the first roller other than the suction surface. As a result, the radius of curvature of the end face of the protruding portion can be made smaller than the radius of curvature of the suction surface of the first roller without reducing the entire first roller. As a result, it is possible to suppress a decrease in the number of first workpieces that can be attached to the first roller.

(4) The present invention is the joining device that may be configured in a manner so that the radius of curvature of an end face of the protruding portion is smaller than a radius of curvature (CR2) of an outer peripheral surface of the second roller other than the protruding portion. Thus, even if the second roller as a whole is not reduced, the radius of curvature of the end face of the protruding portion can be made smaller than the radius of curvature of the suction surface of the first roller. As a result, it is possible to suppress a decrease in the number of second workpieces that can be attached to the second roller.

(5) The present invention is the joining device that may further include a speed adjusting unit (56) that adjusts a relative rotation speed of a rotation speed of the second roller with respect to a rotation speed of the first roller so that a difference in moving speed between the first workpiece and the second workpiece becomes smaller at a joint portion where the second workpiece is joined to the first workpiece. Thus, it is possible to suppress the application of a force in the shearing direction between the first workpiece and the second workpiece and as a result, it is possible to reduce deformation or the like of the first workpiece or the second workpiece.

(6) The present invention is the joining device that may be configured as follows: a plurality of recesses (20) that accommodate the first workpiece are formed on the roller outer peripheral surface of the first roller at intervals in the rotational direction of the first roller, and the first roller attaches the first workpiece in the recess and attaches to the roller outer peripheral surface of the first roller a resin frame (26) supplied by the resin frame supply roller (24) in a manner so that an inner peripheral portion of the resin frame (26) overlaps a peripheral portion of the first workpiece, and the second roller joins the second workpiece to the inner peripheral portion of the resin frame and the first workpiece. Thus, deformation of the resin frame in which the inner peripheral portion overlaps the peripheral portion of the first workpiece can be suppressed.

(7) The present invention is the joining device that may be configured as follows: one of the first workpiece and the second workpiece is a first electrode catalyst layer used for a power generation cell, the other of the first workpiece and the second workpiece is a sheet member in which a second electrode catalyst layer (22A) used for the power generation cell and an electrolyte membrane (22B) used for the power generation cell are joined together, the electrolyte membrane is smaller than the second electrode catalyst layer, and the inner peripheral portion of the resin frame is sandwiched between the second electrode catalyst layer around the electrolyte membrane and the first electrode catalyst layer. Thus, a resin-framed membrane electrode assembly can be obtained.

The present invention is not limited to the above disclosure, and various modifications are possible without departing from the essence and gist of the present invention.

The invention claimed is:

1. A joining device that joins a sheet-like first workpiece and a sheet-like second workpiece, comprising:
   a first roller that attaches the first workpiece to a roller outer peripheral surface of the first roller, rotates the attached first workpiece in a conveying direction, and conveys the first workpiece;
   a second roller that attaches the second workpiece to a roller outer peripheral surface of the second roller, rotates the attached second workpiece in the conveying direction, and joins the second workpiece by heat to the first workpiece conveyed by the first roller; and
   a heater that is provided to at least one of the first roller or the second roller and generates heat required for the joining,
   wherein
   the second roller includes:
   a main body drum that is rotatably supported;
   a plurality of protruding portions that are provided at intervals in a rotational direction of the main body drum and protrude from an outer peripheral surface of the main body drum toward a radial direction of the main body drum; and
   a plurality of suction portions that are provided to each of the protruding portions to attach the second workpiece to an end surface of the protruding portion,
   the first roller conveys the first workpiece to which the second workpiece is joined, and
   a radius of curvature of an end face of the protruding portion is smaller than a radius of curvature of a suction surface of the first roller to which the first workpiece is attached.

2. The joining device according to claim 1, wherein the radius of curvature of the suction surface is larger than a radius of curvature of an outer peripheral surface of the first roller other than the suction surface.

3. The joining device according to claim 2, further comprising
   a speed adjusting unit that includes one or more processors that execute computer-executable instructions stored in a memory,
   wherein the one or more processors executing the computer-executable instructions cause the speed adjusting unit to adjust a relative rotation speed of a rotation speed of the second roller with respect to a rotation speed of the first roller in a manner so that a difference in moving speed between the first workpiece and the second workpiece becomes smaller at a joint portion where the second workpiece is joined to the first workpiece.

4. The joining device according to claim 1, wherein the radius of curvature of an end face of the protruding portion is smaller than a radius of curvature of an outer peripheral surface of the second roller other than the protruding portion.

5. The joining device according to claim 4, further comprising a speed adjusting unit that includes one or more processors that execute computer-executable instructions stored in a memory,
   wherein the one or more processors executing the computer-executable instructions cause the speed adjusting unit to adjust a relative rotation speed of a rotation speed of the second roller with respect to a rotation speed of the first roller in a manner so that a difference in moving speed between the first workpiece and the second workpiece becomes smaller at a joint portion where the second workpiece is joined to the first workpiece.

6. A joining device that joins a sheet-like first workpiece and a sheet-like second workpiece, comprising:
   a first roller that attaches the first workpiece to a roller outer peripheral surface of the first roller, rotates the attached first workpiece in a conveying direction, and conveys the first workpiece;
   a second roller that attaches the second workpiece to a roller outer peripheral surface of the second roller, rotates the attached second workpiece in the conveying direction, and joins the second workpiece by heat to the first workpiece conveyed by the first roller; and
   a heater that is provided to at least one of the first roller or the second roller and generates heat required for the joining,
   wherein
   the second roller includes:
   a main body drum that is rotatably supported;
   a plurality of protruding portions that are provided at intervals in a rotational direction of the main body drum and protrude from an outer peripheral surface of the main body drum toward a radial direction of the main body drum; and
   a plurality of suction portions that are provided to each of the protruding portions to attach the second workpiece to an end surface of the protruding portion,
   a plurality of recesses that accommodate the first workpiece are formed on the roller outer peripheral surface of the first roller at intervals in the rotational direction of the first roller, and
   the first roller attaches the first workpiece in the recess and attaches, to the roller outer peripheral surface of the first roller, a resin frame supplied by a resin frame supply roller in a manner so that an inner peripheral portion of the resin frame overlaps a peripheral portion of the first workpiece, and
   the second roller joins the second workpiece to the inner peripheral portion of the resin frame and the first workpiece.

7. The joining device according to claim 6, wherein one of the first workpiece and the second workpiece is a first electrode catalyst layer used for a power generation cell,
   the other of the first workpiece and the second workpiece is a sheet member in which a second electrode catalyst layer used for the power generation cell and an electrolyte membrane used for the power generation cell are joined together,
   the electrolyte membrane is smaller than the second electrode catalyst layer, and
   the inner peripheral portion of the resin frame is sandwiched between the second electrode catalyst layer around the electrolyte membrane and the first electrode catalyst layer.

* * * * *